United States Patent [19]

Novak et al.

[11] Patent Number: 5,397,201
[45] Date of Patent: Mar. 14, 1995

[54] WALL ASSEMBLY FOR OFFSHORE USE

[75] Inventors: Miloslav Novak, Pittsburgh; R. Rao Valisetty, Murrysville; Jan L. Teply, Monroeville; Andrew P. Antoninka, Lower Burrell; John T. Siemon, Cheswick; Ross E. Grimm, Tarentum, all of Pa.; Claire A. Byars, Pascagoula; Martin F. Fitzgerald, Ocean Springs, both of Miss.; Arun R. Mehta, Mobile, Ala.; Lawrence M. Ruckdeschel, Pascagoula, Miss.

[73] Assignee: Aluminum Company of America, Pittsburgh, Pa.

[21] Appl. No.: 995,190

[22] Filed: Dec. 22, 1992

[51] Int. Cl.⁶ .................. E02B 17/00; E04C 2/38
[52] U.S. Cl. .................. 405/195.1; 52/309.9; 52/309.15; 52/823; 405/211
[58] Field of Search .................. 405/195.1, 203, 204, 405/211, 217; 52/309.1, 309.4, 309.8, 309.9, 309.15, 782, 821, 822, 823; 114/65 R, 355

[56] References Cited

U.S. PATENT DOCUMENTS

| | | | |
|---|---|---|---|
| 3,791,912 | 2/1974 | Allard | 52/309.9 X |
| 3,815,300 | 6/1974 | Bain | 52/73 |
| 4,215,952 | 8/1980 | Baardsen | 405/211 |
| 4,456,072 | 6/1984 | Bishop | 405/217 X |
| 4,609,305 | 9/1986 | Groeneveld | 405/195.1 |
| 4,931,340 | 6/1990 | Baba | 52/823 X |
| 4,942,708 | 7/1990 | Krumholz et al. | 52/823 X |

Primary Examiner—David H. Corbin
Attorney, Agent, or Firm—Glenn E. Klepac

[57] ABSTRACT

A wall assembly suitable for use on ships and offshore drilling platforms and in similar applications requiring fire resistance, low weight, and strength. The wall assembly includes a light weight principal panel having first and second fiber reinforced polymer skin layers joined to a core, and a metal frame adhered to the skin layers without any through fasteners. The frame preferably includes a first metal plate adhered to the first skin layer and a second metal plate adhered to the second skin layer and welded to the first metal plate. The frame is preferably welded to a metal support structure. The wall assembly may be used as a deck, floor, roof, vertical wall, gate or door.

24 Claims, 2 Drawing Sheets

WALL ASSEMBLY FOR OFFSHORE USE

FIELD OF THE INVENTION

The present invention relates to a wall assembly suitable for use on ships, offshore drilling platforms, fire escape walkways, and similar applications where fire resistance, low weight, and strength are important design criteria. The wall assembly may be used as a deck, floor, roof, vertical wall, gate, or door.

BACKGROUND OF THE INVENTION

Light weight composite panels for offshore use are known in the prior art. For example, Bain U.S. Pat. No. 3,815,300 shows a prefabricated flight deck structure for offshore drilling platforms. The deck structure comprises a honeycomb core between upper and lower plywood skins. The upper skin is waterproofed by a protective coating of fiberglass reinforced resin. A set of spaced, longitudinally and transversely extending beams supports the deck. The beams and deck structure are held together by metal bolts extending through the honeycomb core and both skins.

The prior art composite deck structures generally suffer from one or more serious disadvantages making them less than entirely suitable for their intended purpose. For example, prior art deck structures that are held together or fastened to adjacent superstructures with metal bolts are heavy, expensive, and time consuming to fabricate and assemble. In addition, when there is a fire near a wood or polymer panel held together by bolts, the connection to adjacent supports is quickly loosened as fire erodes portions of the panel adjacent to the bolts.

It is a principal objective of the present invention to provide a wall assembly suitable for attachment to adjacent support structures on ships and offshore platforms without any metal bolts or other through fasteners.

A related objective of the invention is to provide a wall assembly of the type described that can be assembled without any metal bolts or other through fasteners.

Additional objectives and advantages will become apparent to persons skilled in the art from the following specification and claims.

SUMMARY OF THE INVENTION

In accordance with the present invention, there is provided a light weight, fire-resistant wall assembly suitable for use on ships and offshore drilling platforms. The wall assembly is attached to adjacent support structures without any metal bolts or other through fasteners.

The preferred wall assembly comprises a light weight principal panel which includes first and second skin layers each comprising a fiber reinforced polymer. A core supports the two skin layers. The skin layers and core together make up a sandwich laminate. The first skin layer has a first inner surface portion joined to the core, and the second skin layer has a second inner surface portion also joined to the core. As used herein, the term "light weight" refers to a panel having an overall specific gravity of less than about 0.80, preferably less than about 0.70. A particularly preferred panel has an overall specific gravity of approximately 0.62 (equivalent to 38.7 lb/ft$^3$).

The core preferably comprises first and second core layers of balsa wood or a polymer, and a fiber reinforced polymer middle layer between the first and second core layers. The first and second core layers have a specific gravity of less than about 0.25, preferably less than about 0.20. In a particularly preferred embodiment, the core layers are balsa wood having a specific gravity of about 0.15 (equivalent to about 9.5 lb/ft$^3$).

Alteratively, the first and second core layers may be rigid foam polymer layers or honeycomb polymer or ceramic layers. For some applications, the middle layer may be eliminated. In such applications, the first and second core layers are combined into a unitary balsa, rigid foam or honeycomb structure without any middle layer separating them.

The skin and middle layers each include polymer matrices which may be reinforced with glass, polymer, ceramic, or graphite fibers. Glass, polyaramide and graphite fibers are preferred. The reinforcing fibers may be random, oriented, or in woven or stitched mats. The polymer matrix may be a vinyl ester, epoxy or a phenol formaldehyde resin. The skin and middle layers preferably comprise a vinyl ester reinforced with E-glass woven fiber mats. The glass fibers typically constitute about 60 vol. % of the polymer layers.

The wall assembly also comprises a metal frame that includes a first metal plate having a proximal portion adhered to the first skin layer and a distal portion extending laterally outward of the principal panel. The frame further comprises a second metal plate having a proximal portion adhered to the second skin layer and a distal portion attached to the first metal plate, preferably by welding. At least one of the metal plates is welded to an adjacent metal support structure. The metal plates alternatively may be adhesively bonded to the support structure.

The frame may also include a third metal plate having a proximal portion welded to the second metal plate and a distal portion extending outward of the principal panel. The distal portion may be attached to the support structure, preferably by welding. The three metal plates are made from steel or aluminum with steel being preferred.

DETAILED DESCRIPTION OF A PREFERRED EMBODIMENT

Figure 1:
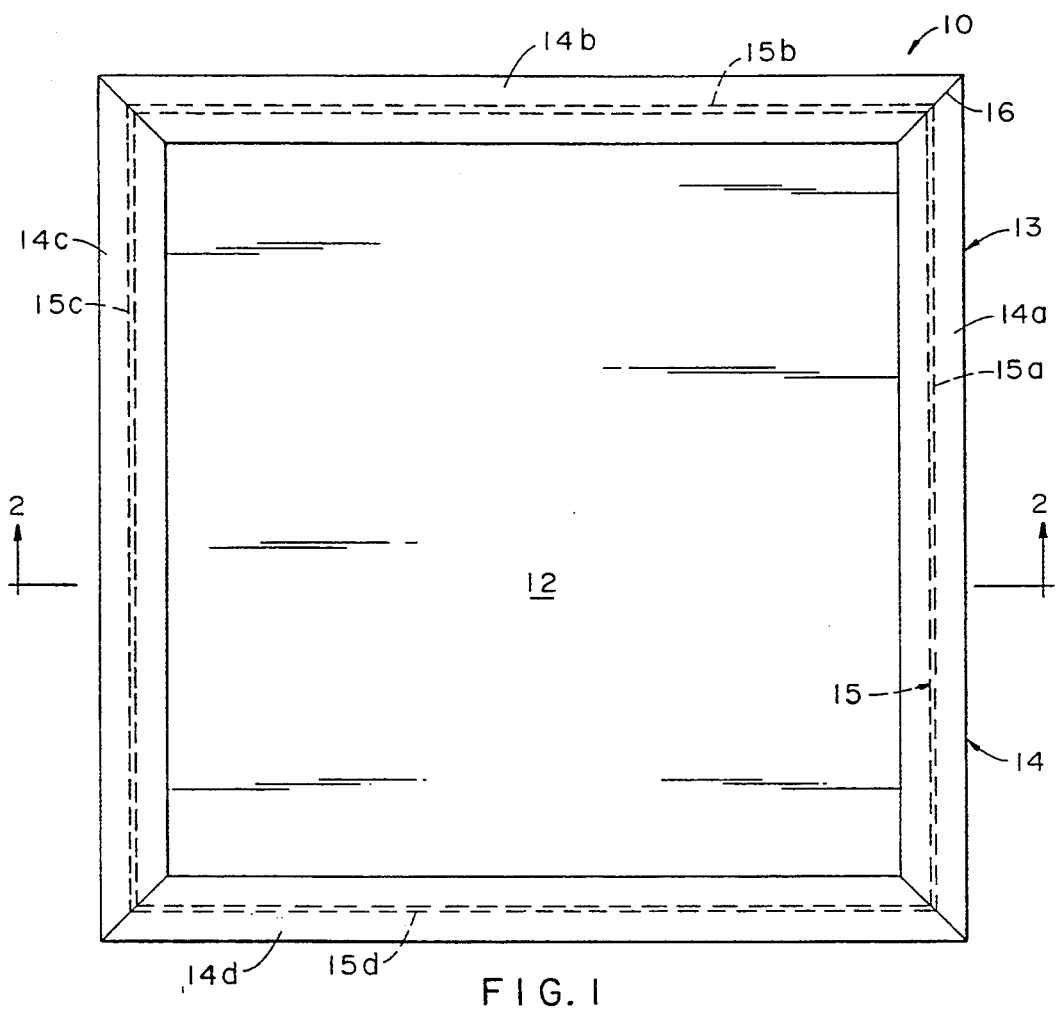
FIG. 1 is a top plan view of a wall assembly made in accordance with the present invention.
Figure 2:
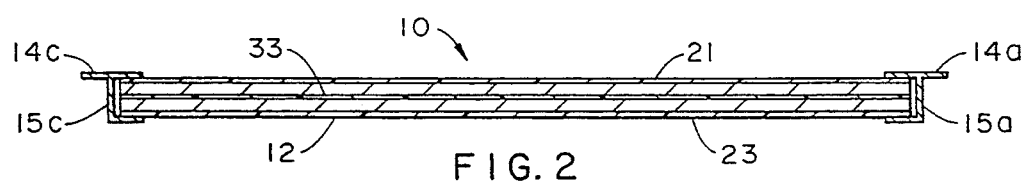
FIG. 2 is a cross-sectional view taken along the lines 2—2 of FIG. 1.

There is shown in FIGS. 1 and 2 a preferred wall assembly 10 made in accordance with the present invention. The wall assembly includes a light weight principal panel 12 and a metal frame 13 comprising a first metal plate 14 and a second metal plate 15.

As shown in FIG. 1, the first metal plate 14 is constructed in four sections 14a, 14b, 14c, 14d, all of which have beveled edges 16 at corners of the assembly 10. The principal panel 12 is manufactured in square modules, each having outer dimensions of approximately 8 ft×8 ft. The principal panel 12 may have a variety of sizes and shapes, with straight, curved or irregular sides.

Figure 3:
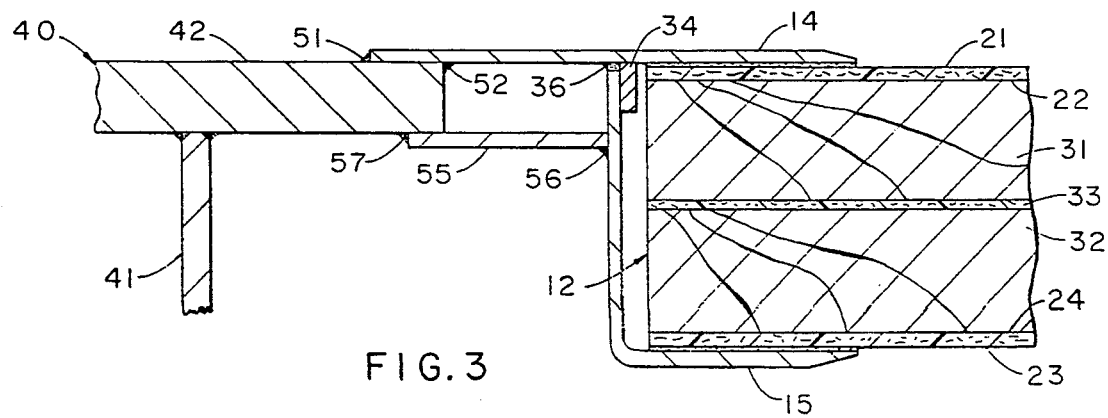
FIG. 3 is a fragmentary cross-sectional view of a particularly preferred wall assembly of the present invention joined to an adjacent superstructure.

Referring now to FIG. 3, a preferred embodiment of the principal panel 12 includes a first skin layer 21 having a first inner surface portion 22 and a second skin layer 23 having a second inner surface portion 24. The skin layers 21, 23 are joined by a core comprising a first core layer 31, a second core layer 32, and a middle layer 33 between the two core layers 31, 32. The first core layer 31 is joined to the first inner surface portion 22, and the second core layer 32 is joined to the second inner surface portion 24. The first core layer 31 and the second core layer 32 are joined to the middle layer 33.

The skin layers 21, 23 and middle layer 33 are all made from a vinyl ester reinforced with E-glass woven fiber mats. The glass fibers constitute approximately 60 vol. % of the polymer layers 21, 23, 33. The first and second core layers 31, 32 are made from balsa wood having a specific gravity of about 0.15 (equivalent to a density of about 9.5 lb/ft$^3$) in the particularly preferred embodiment described herein. The wood grain in layers 31, 32 is parallel to the thickness direction. Each core layer 31, 32 is made up of several smaller wood pieces that are joined together edgewise with yellow carpenter's glue to form a unitary structure.

The first and second core layers 31, 32 and polymer layers 21, 23, 33 are joined together with an epoxy adhesive to form a sandwich laminate.

The middle layer 33 becomes a structural skin after structural damage to the panel 12 in case of fire. If one of the panel sides (i.e., either first skin layer 21 and core layer 31 or second skin layer 23 and core layer 32) is burned away by fire, the middle layer 33 becomes a temporary skin for the remaining panel side.

The first core layer 31 and second core layer 32 each have a thickness of about 1.75 in. The middle layer 33 has a thickness of about 0.08 in. The first skin layer 21 and second skin layer 23 each have a thickness of about 0.25 in. When assembled together, the balsa core layers 31, 32 and polymer layers 21, 23, 33 have a total thickness of about 4.15 in.

The principal panel 12 will generally have a total thickness between about 0.4 in (1 cm) and 6 in (15 cm). The preferred principal panels described herein have substantially constant thickness or depth across their entire length and width. We prefer not to taper the panels in the thickness direction so that they can be manufactured by mass production methods.

The wall assembly 10 is assembled as shown in FIG. 3. The first steel plate or top plate 14 is initially welded to a steel backing bar 34. The first plate 14 is then adhesively bonded to the exterior surface of the first skin layer 21. The second metal plate 15 is also similarly bonded to the second skin layer 23. The skin layers 21, 23 are bonded to the metal plates 14, 15 with an epoxy adhesive having a shear strength of about 3,000 psi. After adhesive bonding is completed, the second metal plate 15 is welded to the first plate 14 and backing bar 34 at weld site 36 shown in FIG. 3. The wall assembly 10 is now ready for shipment to a shipyard or to an offshore platform assembly location where the assembly 10 is attached to an adjacent support structure 40.

As shown in FIG. 3, the metal support structure 40 may comprise a vertical steel plate 41 supporting a horizontal steel plate 42.

The wall assembly 10 is joined to the support structure 40 through a succession of welding steps. First, the top plate 14 is welded to the steel plate 42 at weld sites 51, 52. Next, a steel closure plate or third metal plate 55 is welded to the bottom plate 15 at weld site 56 and to the steel plate 42 at weld site 57. The wall assembly 10 and superstructure 40 are now securely welded in a unitary deck structure.

Figure 4:
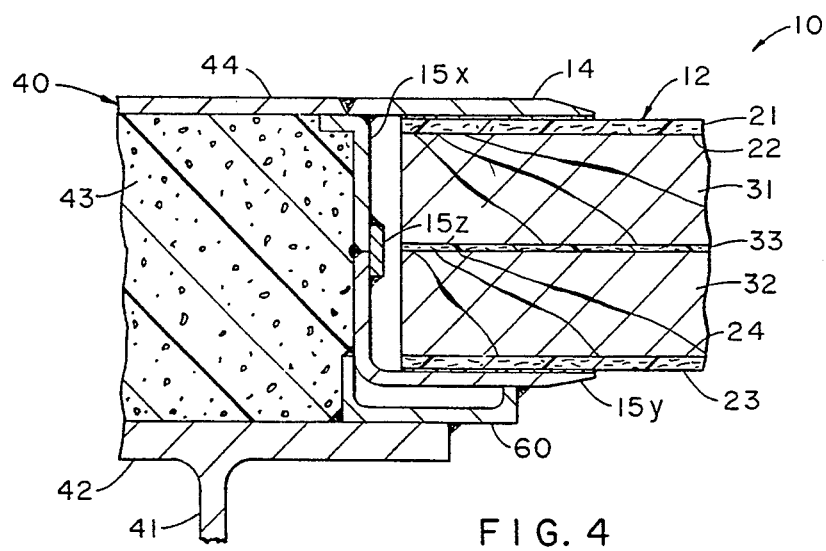
FIG. 4 is a fragmentary cross-sectional view showing an alternative embodiment of the invention.

An alternative embodiment of the wall assembly 10 of the present invention is shown in FIG. 4. The superstructure 40 comprises a vertical plate 41 supporting a lower horizontal plate 42, insulating material 43, and an upper horizontal plate or closeout plug 44. The lower plate 42 and upper plate 44 are both metal, preferably steel. The insulating material 43 may be mineral wool, glass fibers, or a foamed polymer containing a flame-retardant additive. The principal panel 12 is framed by an upper or first metal plate 14 and a lower or second metal plate 15 formed in three plate sections 15x, 15y, 15z. A metal spacer plate 60 is welded to the lower section 15y of the second metal plate 15. Next, the second metal plate 15y is joined to the second skin layer 23 of the principal panel 12. Finally, the spacer plate 60 is welded to the lower plate 42. The metal spacer plate 60, acting as a spacer, prevents heat damage to the polymer layer 23 which would otherwise result if the lower metal plate 15y was welded directly to the lower horizontal plate 42.

Figure 5:
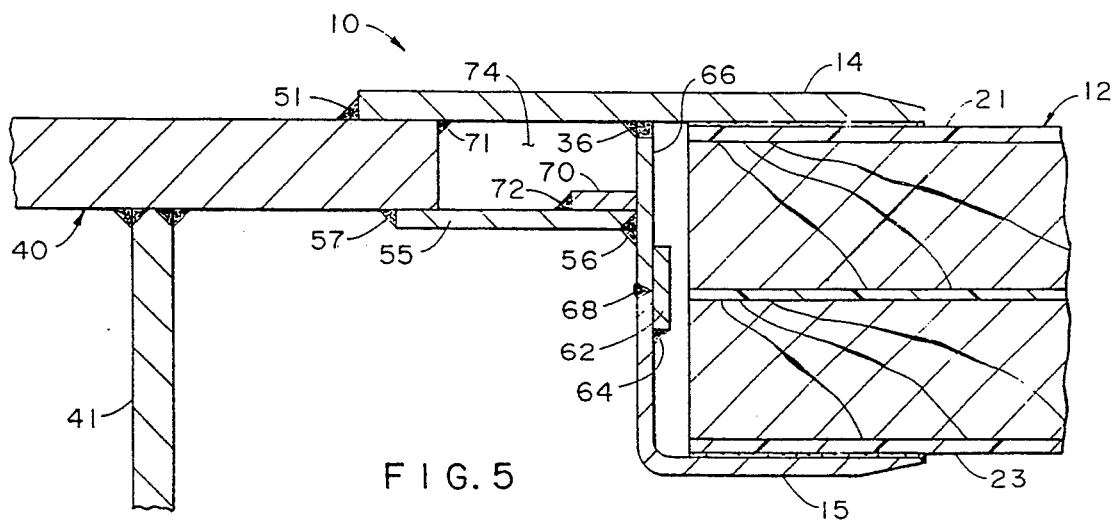
FIG. 5 is a fragmentary cross-sectional view of another preferred wall assembly of the present invention joined to an adjacent superstructure.

Referring now to FIG. 5, another embodiment of the wall assembly 10 is shown where like components to those of FIG. 3 are identified by the same numbers for ease in understanding this embodiment of the present invention.

The principal panel 12 is identical to that as has been described concerning FIG. 3, and its assembly prior to being joined to a support structure is substantially similar to that as has been described.

The wall assembly 10 of FIG. 5 is joined to the support structure 40 through a succession of welding steps. First, the proximal portion of metal plate 14 is adhesively bonded to the exterior surface of the first skin layer 21 of panel 12. A flange member 15 is similarly adhesively bonded to the exterior surface of the second skin layer 23. After adhesive bonding is complete, a backing bar 62 is welded to the end of flange member 15 at a weld site 64. Next, an inner close-out metal plate 66 is sized to complete the metal frame of the panel 12 and welded to the flange 15 at weld site 68 and to the metal plate 14 at weld site 36.

The wall assembly 10 of FIG. 5 is now ready for shipment to an assembly location where the assembly 10 is to be attached to a support structure such as the superstructure 40 with its vertical plate 41. The wall assembly 10 is joined to the support structure 40 through a succession of welding steps. First, the top plate 14 is welded to the steel plate 40 at weld sites 51 and 71. Next, a backing bar 70 is welded to a metal closure plate 55 at weld site 72. The closure plate 55 is welded to the support structure 40 at weld site 57 and to the inner close-out plate 66 at weld site 56. The wall assembly 10 and superstructure 40, 41 are now securely welded in a unitary structure. If desired, the void space or volume 74 formed by plate 14, close-out plates 55 and 66 and the superstructure 40 is treated to avoid corrosion and preferably filled with a nonreactant foam or the like.

Figure 6:
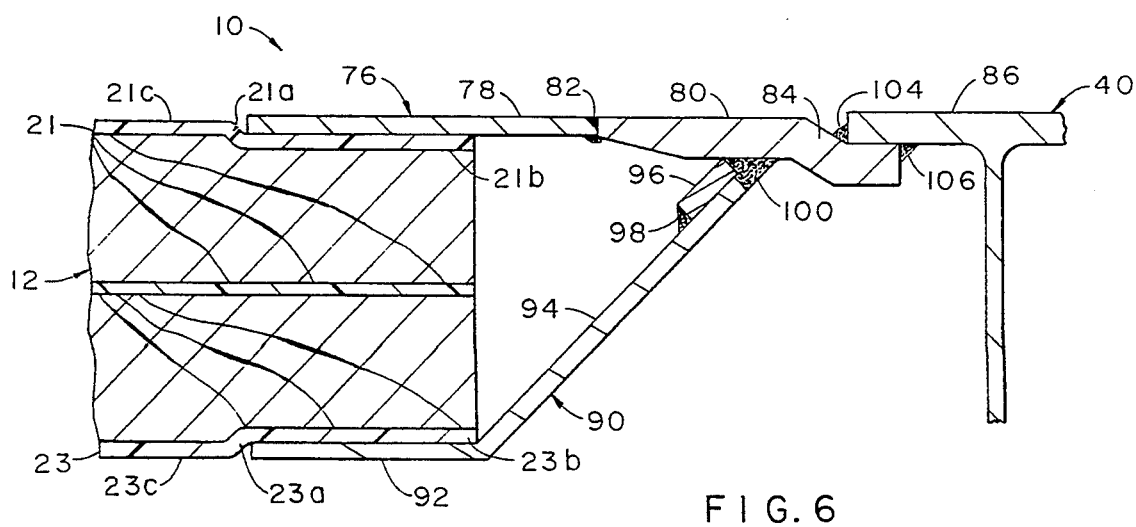
FIG. 6 is a fragmentary cross-sectional view showing yet another alternative embodiment of the invention joined to an adjacent superstructure.

Referring now to FIG. 6, another alternative embodiment of the wall assembly 10 of the invention is shown joined to an adjacent superstructure 40. Again, like numbers indicate similar members as have been described. Outer plate 76 is made from two flat metal plates 78 and 80 that are welded together at weld site 82. Plate 80 is formed or joggled at area 84 so that the outer plate 76 develops an outer surface that is substantially flush with or in the same plane as the outer surface 86 of the superstructure 40. The length and width of outer plate 76 is dependent on the specific design requirements of the wall assembly and its relationship with the adjacent superstructure.

Inner plate 90 of the wall assembly 10 of FIG. 6 is flanged with the shorter leg portion 92 adhesively bonded to the composite or principal panel 12, while the longer leg portion 94 is welded to backing bar 96 at weld site 98. Leg portion 94 with backing bar 96 are welded to the outer plate, specifically flat metal plate 80, at weld site 100.

The wall assembly 10 of FIG. 6 is joined to the support structure 40 again by welding. The outer plate 76 is welded to the superstructure 40 at weld sites 104 and 106. The joggled plate 80 thereby positions the wall assembly so that its outer surface as defined by its outer plate 76 is substantially flush with the outer surface 86 of the superstructure 40. Since there are no closure plates as described and shown in the wall assembly of FIGS. 1 through 5, this embodiment of wall assembly is simplified in both its construction and in its final assembly into a superstructure.

A composite balsa/polymer principal panel 12 made in accordance with the present invention weighs about 13.4 lb/ft$^2$. The total weight of an 8 ft.×8 ft. panel is about 857 lb. In contrast, a comparable steel panel weights about 16.7 lb/ft$^2$ for a total weight of about 1068 lb. in one 8 ft.×8 ft. panel. Total weight saved is about 211 lb. per panel.

Avoidance of steel bolts for joining the balsa/polymer panels to adjacent superstructures also represents a considerable savings in labor and weight. We estimate that about 88 one-pound steel bolts would be needed to join each 8 ft.×8 ft. panel to adjacent support structures. On a ship made with 2500 panels, the total weight penalty for using steel bolts rather than the welded metal frame of the invention would be approximately 220,000 pounds.

The principal panel 12 has excellent static strength properties. In a series of pressure load tests, the panel survived a minimum of 32 psi uniformly distributed pressure.

In a series of bending tests, the panel survived a maximum applied moment of 23,000 in-lb/in and a transverse shear force of 1,500 lb/in without damage.

All test specimens were made with skin layers and middle layers containing a phenolic resin reinforced with E-glass fiberwoven mats and balsa wood core layers. The frames were steel.

While the invention has been described in terms of preferred embodiments, the claims appended hereto are intended to encompass all embodiments which fall within the spirit of the invention.

What is claimed is:

1. A wall assembly suitable for attachment to adjacent support structures on ships and offshore platforms without any through fasteners, said wall assembly comprising:
   (a) a light weight principal panel comprising:
      (i) first and second skin layers each comprising a fiber reinforced polymer, and
      (ii) a core joined to inner surface portions of respective said skin layers; and
   (b) a metal frame adhered to exterior surfaces of said first and second skin layers without any fasteners penetrating said panel, said frame being suitable for attachment to an adjacent metal support structure without any through fasteners penetrating said frame, said metal frame comprising:
      (i) a first metal plate having a proximal portion adhered to an exterior surface of said first skin layer and a distal portion extending outward of said principal panel; and
      (ii) a second metal plate having a proximal portion adhered to an exterior surface of said second skin layer and a distal portion attached to said first metal plate.

2. The wall assembly of claim 1 wherein at least one of said metal plates is welded to a metal support structure.

3. The wall assembly of claim 1 wherein said second metal plate is welded to said first metal plate at a weld site spaced from said principal panel.

4. The wall assembly of claim 3 further comprising:
   (iii) a third metal plate having a proximal portion welded to the second metal plate and a distal portion for attachment to a support structure, said distal portion extending outward of said principal panel.

5. The wall assembly of claim 1 wherein said principal panel comprises a sandwich laminate having:
   (i) a first skin layer;
   (ii) a second skin layer;
   (iii) a first core layer of balsa wood or foamed or honeycomb polymer;
   (iv) a second core layer of balsa wood or foamed or honeycomb polymer; and
   (v) a middle layer comprising a fiber reinforced polymer between the first and second core layers.

6. The wall assembly of claim 5 wherein said first and second skin layers and said middle layer are reinforced with glass or polyaramide or graphite fibers.

7. The wall assembly of claim 6 wherein said fibers are unidirectional or woven or stitched fiber mats.

8. The wall assembly of claim 5 wherein said first and second core layers have a specific gravity of less than about 0.25.

9. The wall assembly of claim 1 wherein said principal panel has substantially constant depth.

10. The wall assembly of claim 1 wherein said principal panel has a specific gravity of less than about 0.20.

11. The wall assembly of claim 1 wherein said principal panel comprises balsa wood.

12. The wall assembly of claim 1 wherein said first and second skin layers comprise a polymer matrix reinforced with glass fibers.

13. The wall assembly of claim 1 wherein said exterior surfaces of both the first and second skin layers are adhesively bonded to the first and second metal plates with an epoxy adhesive.

14. A welded wall structure suitable for use on ships and offshore platforms, said wall structure comprising:
   (a) a light weight principal panel including first and second skin layers on opposite outer sides thereof, each said skin layers comprising a fiber reinforced polymer;
   (b) a metal frame adhered to exterior surfaces of the first and second skin layers without any through fasteners, said metal frame comprising:

(i) a first metal plate having a proximal portion adhesively bonded to an exterior surface of the first skin layer and a distal portion extending outward of said principal panel; and (ii) a second metal plate having a proximal portion adhesively bonded to an exterior surface of the second skin layer and a distal portion welded to the first metal plate at a weld site spaced from said principal panel; and (c) a metal support structure welded to the distal portion of said first metal plate.

15. The wall structure of claim 14 wherein said metal frame further comprises:

(iii) a third metal plate having a proximal portion welded to the second metal plate and a distal portion welded to the metal support structure.

16. The wall structure of claim 14 further comprising:

(d) a metal spacer plate connecting the second metal plate to the metal support structure.

17. The wall structure of claim 14 wherein said principal panel comprises:

(i) a first skin layer;

(ii) a second skin layer;

(iii) first and second core layers of balsa wood or foamed or honeycomb polymer, said first and second core layers each having a specific gravity less than 0.25; and (iv) a middle layer comprising a fiber reinforced polymer between the first and second core layers.

18. The wall support structure of claim 17 wherein said middle layer and said first and second skin layers are reinforced with glass or graphite or polyaramide fibers.

19. A welded wall structure suitable for use on ships and offshore platforms, said wall structure comprising:

(a) a light weight principal panel including first and second skin layers on opposite outer sides thereof, each said skin layers comprising a fiber reinforced polymer;

(b) a metal frame adhered to an exterior surface of the first and second skin layers without any through fasteners, said metal frame comprising:

(i) a first metal plate having a proximal portion adhesively bonded to an exterior surface of the first skin layer and a distal portion extending outward of said principal panel; and (ii) a second metal plate having a proximal portion adhesively bonded to an exterior surface of the second skin layer and a distal portion welded to the first metal plate at a weld site spaced from said principal panel; and (c) a metal support structure comprising a lower plate and an upper plate spaced from said lower plate, said upper plate being welded to said first metal plate; and (d) a metal spacer plate welded to said lower plate and to said second metal plate.

20. The welded wall structure of claim 19 wherein said lower and upper plates, said first and second metal plates and said spacer plate are made from steel or aluminum.

21. A welded wall structure suitable for use on ships and superstructures, said wall structure comprising:

(a) a lightweight principal panel including first and second skin layers on opposite outer sides thereof, each of said skin layers comprising a fiber reinforced polymer;

(b) a metal frame adhered to exterior surfaces of the first and second skin layers without any through fasteners, said metal frame comprising:

(i) a first metal plate having a proximal portion adhesively bonded to an exterior surface of the first skin layer, and a distal portion extending outward of said principal panel;

(ii) a second metal plate having a proximal portion welded to an exterior surface of the distal portion of said first metal plate at a first weld site spaced from said principal panel and having a distal portion extending outward of said first weld site, said distal portion of said second metal plate further developing an outer exposed edge;

(iii) a third metal plate having a proximal portion adhesively bonded to an exterior surface of the second skin layer and a distal portion welded to the first metal plate at a second weld site spaced between said first weld site and said outer edge of said second metal plate distal portion; and (c) a metal support structure welded to said outer edge of said second metal plate distal portion.

22. The wall structure of claim 21 wherein said distal portion of said second metal plate is joggled so that an exposed surface developed by said principal panel and by said first and second metal plates is substantially flush with an exposed surface developed by said metal support structure.

23. The wall structure of claim 22 wherein said exposed surface developed by said first and second joined metal plates and said exposed surface developed by said metal support structure are in a common plane.

24. The wall structure of claim 21 wherein a backing bar is first welded to said distal end of said third metal plate at a third weld site spaced from said principal panel so that said backing bar and said distal end are joined to said second metal plate at said second weld site.

* * * * *